May 2, 1939.    M. P. CHAPLIN    2,156,583
HOLDING AND SUPPORTING MEMBER
Filed May 20, 1937

Inventor,
Merle P. Chaplin

Patented May 2, 1939

2,156,583

UNITED STATES PATENT OFFICE 2,156,583

HOLDING AND SUPPORTING MEMBER

Merle P. Chaplin, South Portland, Maine, assignor to Chaplin Corporation, South Portland, Maine, a corporation of Maine Application May 20, 1937, Serial No. 143,763

4 Claims. (Cl. 24—17)

This invention has to do with a supporting and retaining band for use in connection with a moulded pulp article disclosed in my co-pending application No. 113,308.

One of the features of this band is a novel form of locking and interlocking design to secure the ends of the band together forming a circle. When joined by the means hereinafter described the circular band is capable not only of resisting stress tending to increase its diameter and circumference but also of resisting any tendency to reduce its circumference by compression or strains about its circumference.

The band has a further purpose of providing means for supporting superimposed articles and more particularly so in connection with an assembly of the band disclosed herein together with the pulp article of my co-pending application above referred to.

The following figures illustrate my preferred form of construction:

For practical purposes it is desirable that the band prior to use be made up in a flat strip and packaged flat for shipment to minimize shipping space. This flat strip must be provided with a suitable means for joining the ends together prior to its use and this joining together should preferably be without the use of rivets, staples, adhesives or other similar means which require time for application as well as additional equipment and labor.

Figure 1:
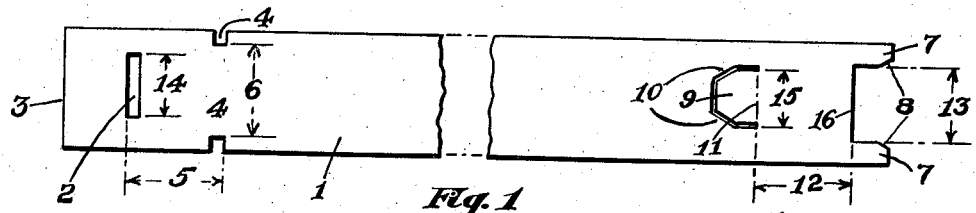
Fig. 1 is a view of the band showing in general the shape of the ends of the band which are to be joined together.

In Fig. 1 it will be noted that one end of the band 1 is provided with a slot 2 located at a distance from the band end 3 and with a fixed length 14 held within narrow limits. At a somewhat greater distance from the end 3 are located two notches 4, one in each edge of the band. The slot 2 and the notches 4 are located at a predetermined distance apart from each other, as indicated at 5. The distance between the inner part of the notches are also located at a predetermined distance from each other, as indicated at 6.

Figure 2:
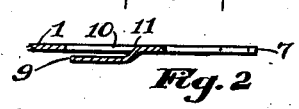
Fig. 2 is an edgewise view of one end of the band showing the tab depressed slightly out of line with the band itself.

On the opposite end of the band 2 are two narrow projecting portions 7 one on each edge of the band, the inner corner of these projections is beveled slightly as indicated at 8. Located at a fixed distance from the end of the band is a tab portion 9, this being formed by cutting through the thickness of the band at 10 and folding the cut portion slightly out of line with the thickness of the band on line 11 as indicated in Fig. 2.

The fold line 11 of the tab 9 is located at a fixed and predetermined distance 12 from the inner end 16 of the projecting portions 7. The distance between the inner edges of the projecting portions 7 at their straight part is fixed within narrow limits as indicated at 13. The width of the tab 9 at 15 is made a fixed dimension or held within narrow limits.

The distance 5 previously mentioned, between the edge of slot 2 and the edge of notch 4 is made equal to or very slightly greater than the distance 12 on the opposite end of the band, this distance being between the bottom end 16 or projection 7 and fold point 11, of the tab 9. The length 14 of slot 2 is made equal to or very slightly greater than the width 15 of the tab 9. The space 13 between the projecting portions 7 is made equal to or slightly greater than the distance 6 between the ends of notches 4. The purpose of these related dimensions will be hereinafter explained.

It has already been stated that the band 1 is made up and shipped flat to minimize shipping space. The tab 9 shown bent slightly downward in Fig. 2 either nests with adjacent tabs above and below or else is pushed back into the opening in the band from which it was cut on line 10. In shipment the bands occupy no more space than their width and combined thickness of the bands themselves when stacked together.

Figure 3:
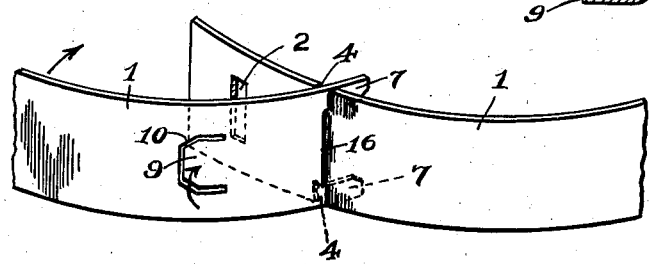
Fig. 3 illustrates the first operation in joining the ends of the band together.
Figure 4:
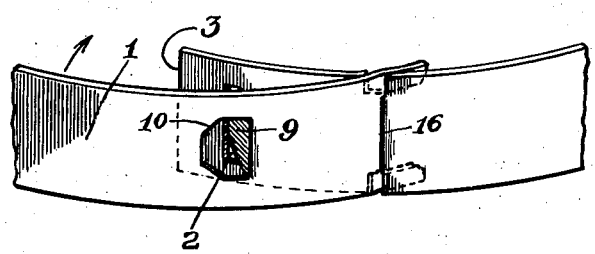
Fig. 4 shows the second operation in joining the ends of the band together.
Figure 5:
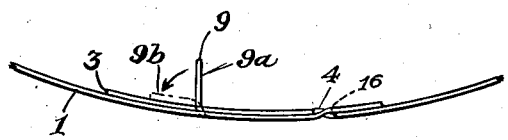
Fig. 5 shows the completion of the second operation, the dotted lines of the tab end indicating the completion of the entire operation making the band up in a complete continuous circle.
Figure 6:
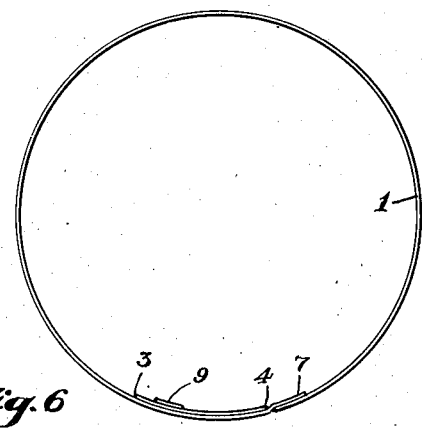
Fig. 6 is a plan view of the band made up as indicated in circular form.

In use the band is made up in circular form as shown in Fig. 6. This is accomplished as follows:

Reference being made to Figs. 3, 4 and 5. The first operation is to insert the projections 7 thru the notches 4 until these projections are inserted entirely thru the notches 4, as indicated in Fig. 3 and the bottom 16 is pushed firmly against the surface of the band as indicated in Fig. 3. The tab 9 is then bent inward, as shown in Fig. 4 and inserted in the slot 2. When thus inserted the tab is bent at approximately right angles to the band as indicated at 9—a in Fig. 5, and the end 3 of the band 1 is pressed outwardly until it contacts the main body of the band as indicated at Fig. 5. The tab 9 is then bent over towards the band end 3 as indicated in Fig. 5 from position 9—a to dotted line position 9—b. This completes the assembly of the band and it is now ready for use, this use being to confine the resilient edges of a moulded pulp article in position and to afford a supporting member for super-imposed articles as illustrated in Fig. 7.

It will be readily understood that the band when assembled in circular form and used as above mentioned is subject to considerable radial pressure tending to increase the band circumference. The band resists being increased in circumference by the tab lock consisting of the tab 9 and slot 2. The tab 9 is held snugly against the band, itself, in the position indicated at 9—b, Fig. 5, by the outer surface of the resilient edges of the moulded pulp article on which it is assembled as illustrated in Fig. 7. This construction forms a strong and secure lock firmly holding the band to fixed circumference, and the resilient edges of the pulp article firmly in position.

Figure 7:
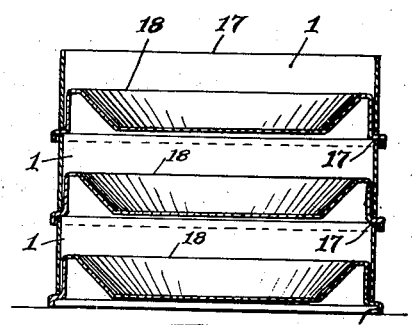
Fig. 7 shows a sectional view thru three of the bands and three of the articles, one being superimposed on the other, indicating the supporting requirements of the band itself.

When superimposed articles are placed on this band, requiring its use as a supporting member, as shown in Fig. 7, it is important that the upper edge 17 of the band 1, which projects a considerable distance above the top 18 of pulp article, be not allowed to collapse inwardly as such collapse would not insure its locking properly in the flange section 19, of the pulp article.

It has already been stated that the distance 5 between the slots 2 and the notches 4, is equal to or slightly greater than the distance 12 between the fold line 11, of tab 9 and the bottom 16 of projection 7. With these respective dimensions fixed or held within narrow limits it will be readily seen that when the tab 9 is in position in the slot 2, as shown in Fig. 5, that the band end 16 is held tightly against the inside end of notches 4, thus preventing any possibility of either edge of this band being reduced in diameter or circumference or of the ends of the band from moving or being moved out of alignment.

In other words, I have provided a band for the particular purpose intended made up in flat form for ready shipment but provided with cooperative locking construction on the band ends permitting it to be readily made up into a continuous band of circular shape and when so made up thereby to resist both radial and centripital pressures.

Having thus described my invention what I claim is:

1. A strip of flexible sheet material to have its end portions overlapped and connected together to form a band, said strip having, near one end thereof, a narrow slot closed at its ends and extending transversely of the strip, said strip also having, near the same end thereof and farther inwardly from said end than said slot, a pair of slots alined transversely of the strip and opening through the opposite side edges thereof, respectively, a pair of tongues projecting from the other end of the strip and spaced apart transversely of the strip for insertion into said pair of slots, respectively, and a tongue struck from said strip near the second mentioned end thereof for insertion through said first mentioned slot and to be bent against the inner face of the strip when said pair of tongues are inserted into said pair of slots, thereby to hold the end portions of the strip overlapped and against movement relative to each other.

2. A strip of flexible sheet material to have its end portions overlapped and connected together to form a band, said strip having, near one end thereof, a transverse slot and also having, near the same end thereof and farther inwardly from said end than said slot, a second transverse slot, a tongue projecting from the other end of the strip for insertion into said second mentioned slot, and a second tongue struck from said strip near the second mentioned end thereof for insertion through said first mentioned slot when said first mentioned tongue is engaged in said second mentioned slot, thereby to hold the end portions of the strip overlapped and against movement relative to each other.

3. A strip as set forth in claim 1 in which the distance between the inner edges of the pair of slots is substantially equal to the distance between the inner edges of the pair of tongues, whereby, when said pair of tongues are engaged in said pair of slots, the end of the strip having said pair of tongues is held against transverse movement relative to the portion of the strip which it overlaps.

4. A strip as set forth in claim 1 in which the distance between the first mentioned slot and the pair of slots is substantially equal to the distance between the base of the tongue that is struck from the strip and the adjacent end of the strip, whereby the overlapped end portions of the strip are held against both band contracting and band expanding movements relative to each other.

MERLE P. CHAPLIN.